Figure 1:
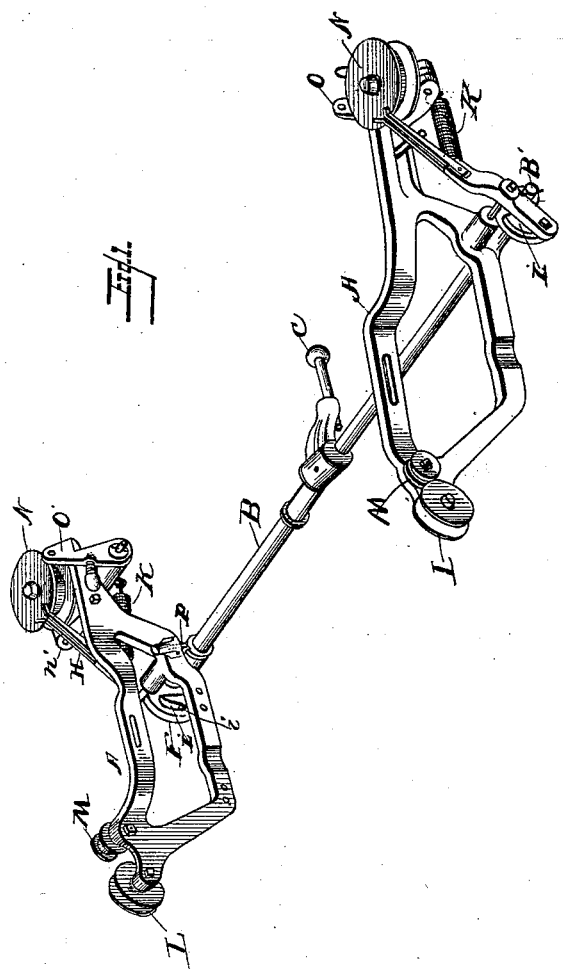

(No Model.) 2 Sheets—Sheet 1.

J. W. BARLOW.
CHECK ROW MECHANISM FOR PLANTERS.

No. 472,976. Patented Apr. 19, 1892.

Witnesses:
J. M. Fowler Jr
Thomas Durant

Inventor
John W. Barlow,
By Church & Church
his Attorneys

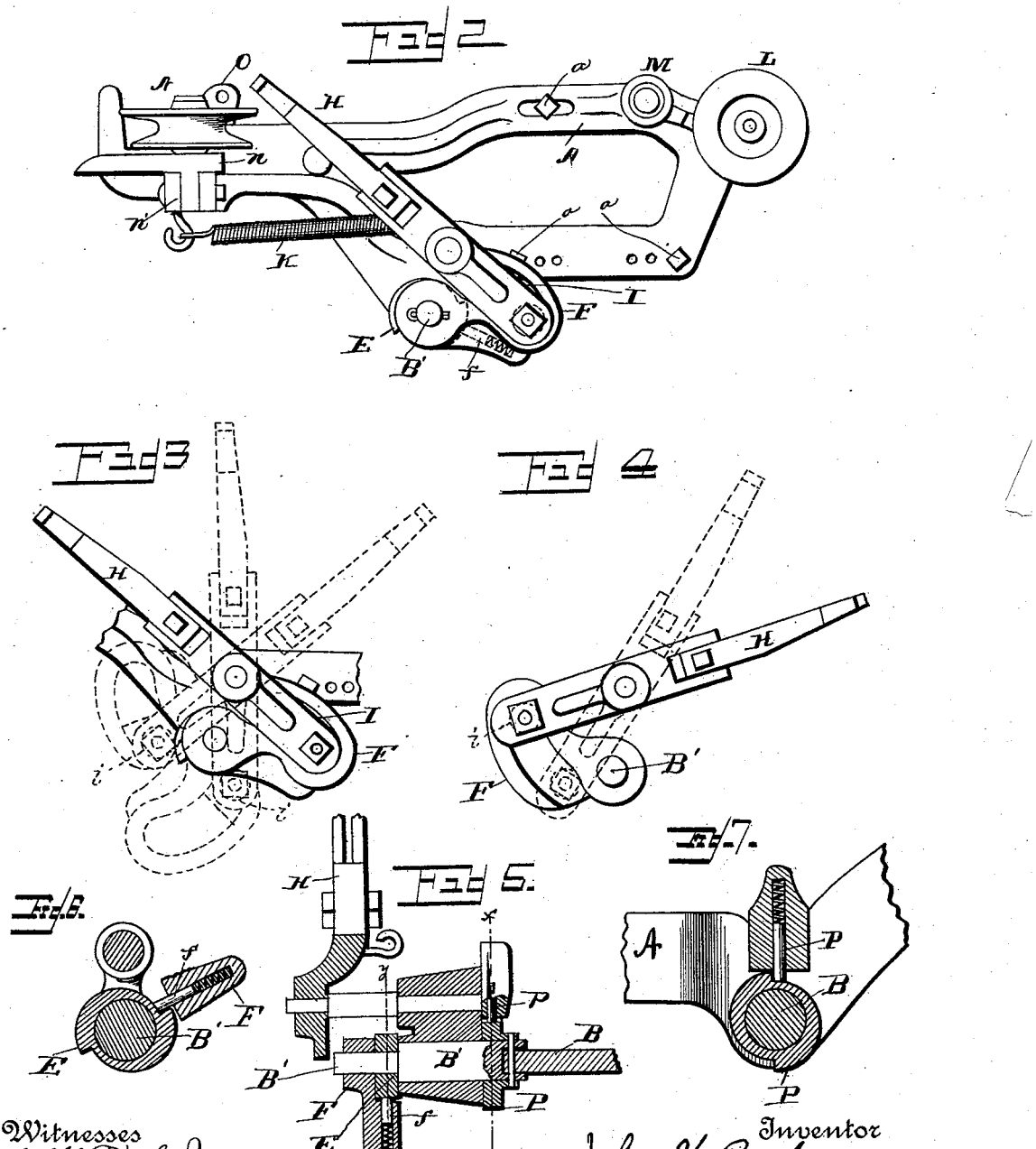

UNITED STATES PATENT OFFICE.

JOHN W. BARLOW, OF QUINCY, ILLINOIS.

CHECK-ROW MECHANISM FOR PLANTERS.

SPECIFICATION forming part of Letters Patent No. 472,976, dated April 19, 1892.

Application filed December 18, 1891. Serial No. 415,484. (No model.)

*To all whom it may concern:*

Be it known that I, JOHN W. BARLOW, of Quincy, in the county of Adams and State of Illinois, have invented certain new and useful Improvements in Check-Row Mechanisms for Planters; and I do hereby declare the following to be a full, clear, and exact description of the same, reference being had to the accompanying drawings, forming a part of this specification, and to the letters of reference marked thereon.

This invention relates particularly to the mechanism for transmitting motion from the check wire or rope to the seeding mechanism or shake-bar of a check-row planter, the objects being to give a full movement of the seeding mechanism with a comparatively small movement of the member co-operating with the check wire or rope and to give the effective stroke while such member is in position to give the most power, further objects being to reduce the power required, and thus reduce the strain on the wire, and to drop the seed in more perfect check by the quick operation of the valve.

Primarily the invention consists in pivoting the operating or forked lever on a different center from the operating-shaft and causing it to move up into proximity with or past said operating-shaft, to which the motion is communicated by a lever which may have a shorter radius than the operating-lever.

The invention further consists in certain novel details of construction and combinations and arrangements of parts, all as will be hereinafter described, and pointed out particularly in the appended claims.

Referring to the accompanying drawings, Figure 1 is a perspective view of a check-row mechanism alone constructed in accordance with my present invention. Fig. 2 is an enlarged end elevation. Figs. 3 and 4 are end elevations showing the different positions of the parts during the movement of the levers and operating-shaft. Fig. 5 is a transverse section through the operating-shaft at one end. Fig. 6 is a detail section on the line $y$ $y$, Fig. 5. Fig. 7 is a detail section on the line $x$ $x$, Fig. 5, showing the pawl for preventing backward rotation of the shaft.

Similar letters of reference in the several figures indicate the same parts.

In illustrating my present invention I have deemed it necessary to show only the check-row mechanism itself, as the connections therewith are well known to those skilled in the art or may be ascertained more particularly by reference to my prior application, Serial No. 408,970.

The end frames A in the present instance are adapted to be secured to the seed-boxes of the planter by bolts $a$, and in the drawings, Fig. 1, said frames are shown in the position they occupy in use, with the operating-shaft B extending between them. In this form of device the motion is transmitted from the shaft to the shake-bar by the eccentric-finger C, as described in my before-mentioned application, and the ends of the shaft within the end frames are preferably made separate, each having a recess, into which the ends of the long section fit, as shown clearly in Fig. 5, to permit of the construction of each end frame complete and for other obvious reasons. The short ends of the shaft, journaled in the end frames and lettered B', extend through to the outside and are provided with ratchet-teeth or ratchet-wheels E, preferably having but two teeth thereon, arranged on diametrically-opposite sides, and outside of the ratchet-teeth is loosely journaled a lever F, which for convenience I shall term a "cam-lever." The cam-lever is provided with a spring-pressed pawl $f$, co-operating with the ratchet-teeth, and when the lever is oscillated a half-turn serves to impart a similar movement to the shaft in one direction.

Instead of adapting the lever on the shaft for co-operation directly with the check-wire, as has heretofore been done, necessitating a long engagement of the wire and a special means for giving the full half-turn, I propose to impart an accelerated movement to the cam-lever by means of a second or what I shall term an "operating-lever" H, having the usual forked end for engagement with the wire and a projection for co-operation with the cam-lever, said operating-lever being pivoted to one side of the operating-shaft and the projection thereon passing in proximity thereto when operated. In the preferred construction the projection passes out around the operating-shaft, and it is obvious that the cam-lever may be given a half-turn by moving the operating-lever through a comparatively short arc, the connection or contacting point between the levers being movable and during each stroke shifting from the end to the base of the cam-lever, and vice versa.

As shown in the drawings, the operating-lever is straight from end to end, including the forked portion, while the cam-lever is provided with a cam-slot I, the outer portion of which is struck in the arc of a circle, with the pivot of the operating-lever as a center, when the cam-lever is at the forward extreme of its stroke. The roller $i$, forming the projection on the operating-lever, fits into the cam-slot I, and when in normal position it occupies the outer end of the slot; but as the operating-lever is moved the roller rides along the inner curved side of the slot, forcing the cam-lever forward with an accelerated motion, until the roller is brought into line with the two centers, as shown in Fig. 3. After the center is passed the motion is maintained by the roller again pressing against the curved inner wall of the slot, giving the operating-shaft a full half-turn, while the operating-lever is almost at right angles to the pull of the wire, or in position to give the most powerful effect. The further movement of the operating-lever forward has no effect on the shaft, as the cam-slot then occupies the position shown in Fig. 4, with its outer portion concentric with the pivot of the operating-lever. The operating-lever is returned to normal position by a spring K, secured to the frame and lever at any suitable points, and the roller, engaging the outer wall of the slot I, carries the cam-lever back to normal position, the pawl in said last-mentioned lever riding over and engaging the next tooth on the shaft, as will be readily understood.

The usual guide-rollers L M for the wire are provided at the back of the frames, and at the front are releasing-pulleys or guide-rollers N, journaled in frames $n$, pivoted to the end frames at $n'$, and held in normal position by the catches O, adapted to be released by the driver, which permits the wire pulling at an angle to turn the pulley over and drop the wire.

It is obvious that the position of the pivot of the operating lever and shaft on the frames may be changed without departing in the least from the invention. For instance, the shaft may be located above the center of the pivot of the operating-lever, and, if found desirable, a second ratchet, such as P, may be located on the frame to prevent the backward movement of the shaft, although this will usually be found unnecessary.

Having thus described my invention, what I claim as new is—

1. In a check-row mechanism for planters, the combination, with the operating-shaft for the seeding mechanism and the lever connected therewith, of the operating-lever pivoted on an independent center and co-operating with the lever connected with the operating-shaft, substantially as described.

2. In a check-row mechanism for planters, the combination, with the operating-shaft for the seeding mechanism and the lever connected therewith, of the operating-lever pivoted on an independent center, having a longer radius and passing in proximity to the center upon which the first-mentioned lever turns and co-operating with said lever, whereby an accelerated motion is imparted to the latter, substantially as described.

3. In a check-row mechanism for planters, the combination, with the operating-shaft for the seeding mechanism and the lever connected therewith, of the operating-lever pivoted on a separate center and having a greater radius than the radius of the first-mentioned lever, said levers being loosely connected for simultaneous movement, whereby the operating-shaft is given an accelerated movement.

4. In a check-row mechanism for planters, the combination, with the operating-shaft for the seeding mechanism and the pivoted lever connected therewith, of the operating-lever pivoted on a separate center and moving across the pivot of the first-mentioned lever, substantially as described.

5. The combination, with the operating-shaft for the seeding mechanism of a check-row corn-planter and the lever mounted thereon, with a pawl-and-ratchet connection between said shaft and lever, of the operating-shaft pivoted on a separate center and co-operating with the lever on the shaft to turn the latter, substantially as described.

6. The combination, with the operating-shaft for the seeding mechanism of a check-row corn-planter and the lever mounted thereon, with a pawl-and-ratchet connection between said shaft and lever, of the operating-lever pivoted on a separate center and moving across the end of the operating-shaft and a loose connection between said levers, substantially as described.

7. The combination, with the operating-shaft for the seeding mechanism of a check-row corn-planter, the lever mounted thereon, having a cam-slot therein, and the pawl-and-ratchet connection between the lever and shaft, of the operating-lever pivoted on a separate center and having the projection fitting in said cam-slot, substantially as described.

8. The combination, with the operating-shaft for the seeding mechanism of a check-row planter, the cam-lever pivoted thereon and having the cam-slot therein, and the pawl-and-ratchet connection between the lever and shaft, of the operating-lever pivoted on an independent center above the shaft and having the roller on its lower end entering the slot in the cam-lever, substantially as described.

9. The combination, with the operating-shaft for the seeding mechanism of a check-row planter and the operating-lever pivoted on a separate center, of the cam-lever on the operating-shaft having a slot therein, the outer portion of which is concentric with the center for the operating-lever when the cam-lever is at the extreme forward position, and a projection on the operating-lever entering such slot, substantially as described.

10. The combination, with the operating-shaft of a check-row planter, the end frame in which said shaft is journaled, the guide-pulleys on the frame, and the cam-lever journaled on the shaft, with a pawl-and-ratchet connection between the shaft and lever, of the operating-lever pivoted on a separate center and having the downwardly-extending end co-operating with the cam-lever and passing over the end of the shaft, substantially as described.

11. The combination, with the operating-shaft of a check-row planter and the cam-lever for turning the same, having the curved cam or bearing surface, of the operating-lever pivoted on a separate center and having a projection engaging the curved bearing-surface on the cam-lever, the arc traversed by said projection passing in proximity to the center on which the cam-lever turns, whereby the latter is given a full half-turn, substantially as described.

JOHN W. BARLOW.

Witnesses:
GEORGE CASTLE,
L. B. BOSWELL.